Sept. 8, 1931.  N. B. RIDDLE  1,822,823
SIGNAL WINDOW FOR DOORS OF AUTOMOBILES
Filed June 23, 1927  2 Sheets-Sheet 1
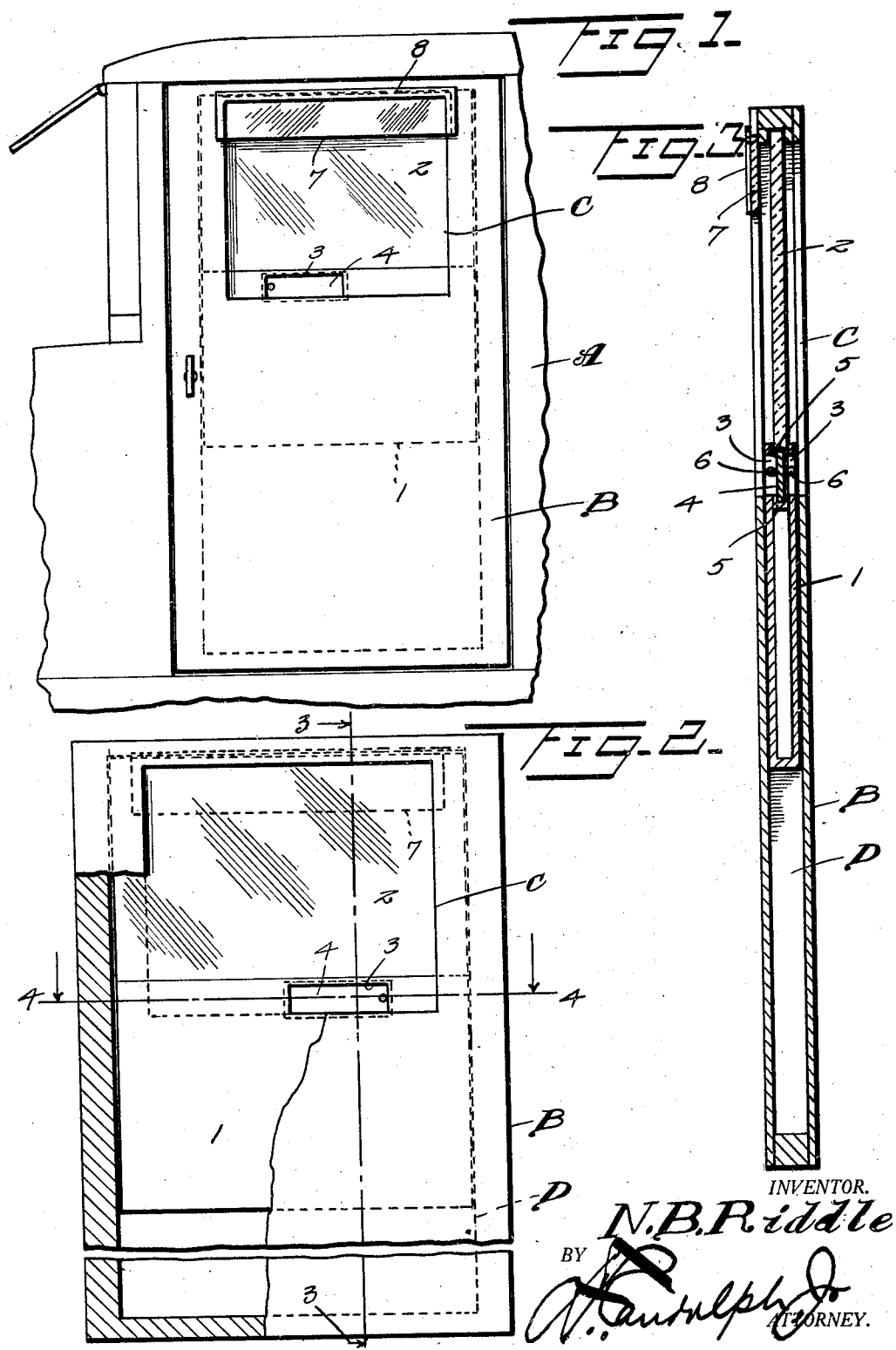
INVENTOR.
N.B. Riddle.
BY
ATTORNEY.

Sept. 8, 1931.  N. B. RIDDLE  1,822,823
SIGNAL WINDOW FOR DOORS OF AUTOMOBILES
Filed June 23, 1927   2 Sheets-Sheet 2
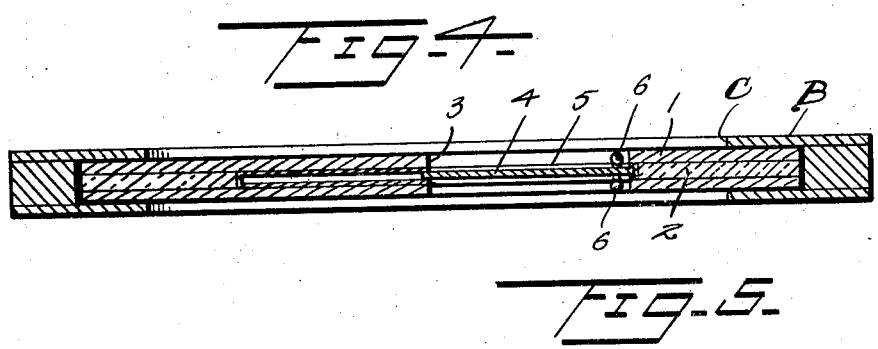
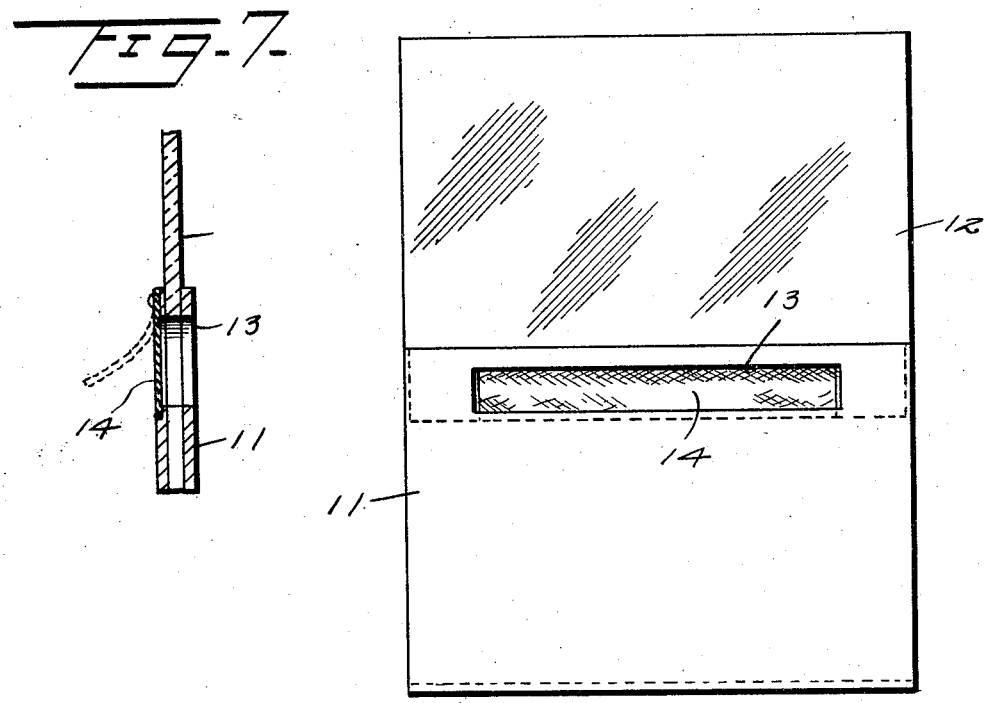
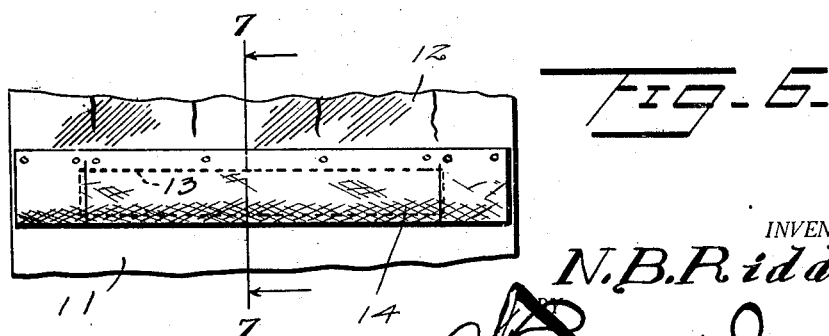
INVENTOR.
N.B.Riddle
ATTORNEY.

Patented Sept. 8, 1931

1,822,823

UNITED STATES PATENT OFFICE

NAPOLEON B. RIDDLE, OF ST. FRANCISVILLE, LOUISIANA

SIGNAL WINDOW FOR DOORS OF AUTOMOBILES

Application filed June 23, 1927. Serial No. 200,947.

The invention relates to improvements in the windows in the doors adjacent to the drivers' seats in motor vehicles and has for its principal object the provision of means by which the driver may signal his intention to stop or turn with his hand without requiring the lowering of the window to project his hand.

A further object of the invention is the provision of an opening in the vertically adjustable frame carrying the transparent plate in an automobile door through which the driver of the automobile may project his hand to signal his intention to stop or to turn said opening being closed by a sliding door.

A further object of the invention is the provision of means to permit opening of the window in an automobile door for ventilation and to prevent a direct draft therethrough by providing a transparent plate secured to the upper outer portion of the door and projecting below the upper edge of the opening therein.

The invention will be described in detail hereinafter and will be found illustrated in the accompanying drawings, in which:

Figure 1 is a fragmental side view of an automobile body showing the door in position therein and the improvements applied thereto, Figure 2 is a view of the inside of the door partly broken away and in section, Figure 3 is a transverse vertical sectional view on a plane indicated by the line 3—3 of Figure 2, Figure 4 is a horizontal sectional view on a plane indicated by the line 4—4 of Figure 2, Figure 5 is an inside view of the adjustable frame showing a modified form of closure for the signal opening, Figure 6 is a fragmental view of the opposite side of Figure 5, and Figure 7 is a transverse sectional view on a plane indicated by the line 7—7 of Figure 6.

In the drawings similar reference characters will be used to designate corresponding parts throughout the several views.

Referring to Figures 1 to 4, inclusive, the body of an automobile is indicated at A in Figure 1, and B is the door adjacent to the operator's seat and having a sight opening C therein. 1 indicates a hollow frame that is slidably mounted in a recess D in the door B below the sight opening C and may be raised and lowered by any means (not shown). 2 indicates a plate of glass or other transparent material carried by frame 1 and adapted to close the opening C when in a raised position as suggested in the drawings. In the upper portion of the frame 1 below the transparent plate 2 an opening is provided designated 3 through which the operator may extend his hand to signal his intention to stop or to change his direction, thus making it possible to signal without lowering the frame 1 and the transparent plate 2 in event of inclement weather. The opening 3 is closed by means of a door 4 that is housed by hollow frame 1 and that is slidably mounted in grooved guides 5 secured in the hollow frame 1 and defining the upper and lower walls of the opening 3, and the door 4 is provided with knobs or buttons 6 to operate the door in opening and closing it.

The door B is also provided with means to permit ventilation of the car by slightly lowering the frame 1 and transparent plate 2 and prevent a direct draft through the opening made thereby comprising a transparent plate 7 secured in the outer side of door B at the upper portion of the opening C and held in position by means of strips 8.

In the modified form shown in Figures 5, 6, and 7, the frame 11 carries a transparent plate 12, and is provided with a signal opening 13 that is covered by a strip 14 of flexible material secured to the outer side of the frame 11 above the opening 13 that is adapted to be moved into the position shown in dotted lines in Figure 7 to permit the projection of the hand of the operator in signaling, the flexible strip returning to its lowered position as shown in full lines in Figure 7 when the hand is withdrawn.

What is claimed is:—

In combination, a hollow vehicle door provided with a sight opening, a frame vertically slidable in the hollow of said door and having a panel adapted to normally close said sight opening, said frame having an opening therethrough below the panel, said latter opening being adapted to register with the sight opening when the panel is in uppermost or closed position whereby a signalling member may be passed therethrough to the exterior of the car, the second mentioned opening being concealed in the lowered position of the frame.

In testimony whereof I affix my signature.

NAPOLEON B. RIDDLE.